Sept. 19, 1933. W. G. CALKINS ET AL 1,927,627

LEAF SPRING

Filed May 28, 1931

INVENTOR.
WILLIAM G. CALKINS AND
BY CLARK A. TEA.
ATTORNEY.

Patented Sept. 19, 1933

1,927,627

UNITED STATES PATENT OFFICE 1,927,627

LEAF SPRING

William G. Calkins and Clark A. Tea, Detroit, Mich., assignors to Chrysler Corporation, Detroit, Mich., a corporation of Delaware Application May 28, 1931. Serial No. 540,706

9 Claims. (Cl. 267—49)

This invention relates to an improved leaf spring of the type used on vehicles and particularly to improved bearings for slidably supporting one of a pair of adjacent spring leafs upon the other.

The main objects of the invention are to provide means in a leaf spring for reducing the frictional resistance to sliding of the leaves with respect to each other; to provide porous metal members of this character which have a substantial capacity for absorbing lubricant and through which lubricant readily permeates to the surfaces that contact with the spring leaves; to provide bearing members which are sufficiently flexible to conform to the curvatures of opposed surfaces of adjacent spring leaves; to provide means of this kind which hold the entire lengths of the opposed surfaces of adjacent leaves apart; to provide bearing elements between the end portions of adjacent leaves which hold the extremities of each leaf in spaced relation to the face of the adjacent leaf so as to prevent the burred extremity of one leaf from digging into a surface of an underlying leaf; and to provide means on the bearing members for holding the latter against movement relative to one of the leaves between which they are disposed.

An illustrative embodiment of the invention is shown in the accompanying drawing, in which.

Figure 1:
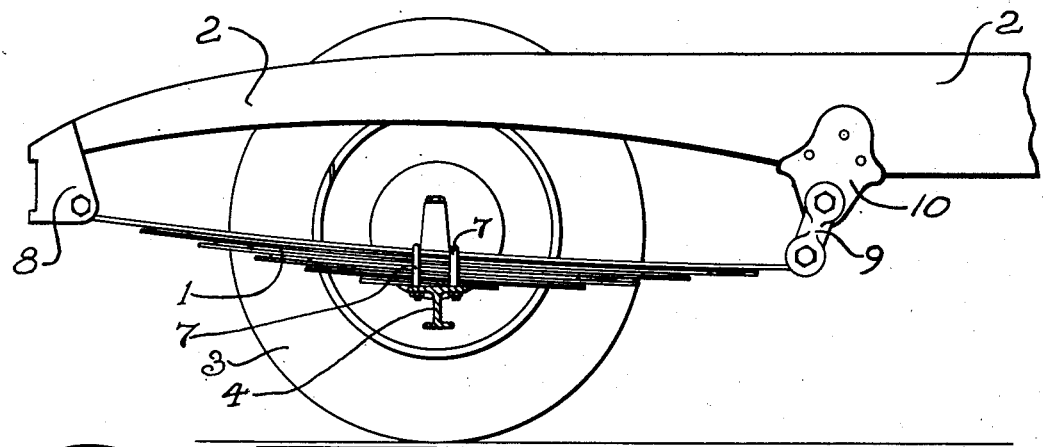
Fig. 1 is a fragmentary side elevation of a vehicle chassis which is equipped with a spring that embodies the invention.
Figure 2:
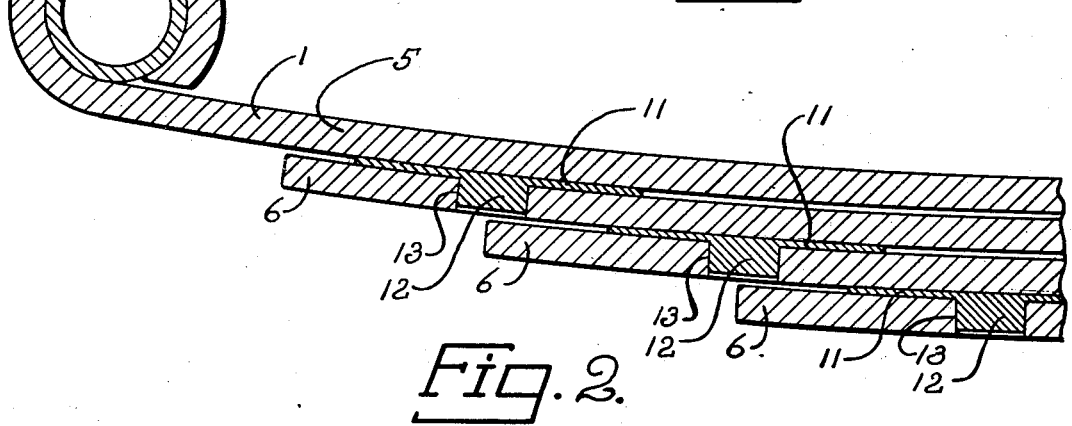
Fig. 2 is a fragmentary, longitudinal, vertical section of the spring leaf shown in Fig. 1.

In the form shown, my improved leaf spring 1 is interposed between the sprung portion of a vehicle chassis, which includes a frame 2, and the unsprung portion of the vehicle chassis, which includes spaced road wheels 3 that are supported by a transverse axle 4. The spring 1 has a main leaf 5 and a plurality of underlying spring leaves 6 of varying lengths. The intermediate portion of the leaf spring is rigidly clamped upon the axle 4 by U-shaped bolts which firmly hold the leaves in superimposed relation. The front end of the main leaf 5 is pivotally connected to the frame 2 of the chassis by a bracket 8 and the rear end of the main leaf is pivotally secured to the frame 2 by a shackle 9 which is swingably mounted on a bracket 10 secured to a side member of the frame.

The spring leaves 6 are held in spaced relation from each other, and from the main leaf 5 by bearing elements 11 which are located between the respectively opposite end portions of each spring leaf and the side of the adjacent leaf. The bearing elements 11 are preferably disc-shaped and they are provided with central lugs 12 which are received in apertures 13 formed in the respectively opposite end portions of the spring leaves 6. The lugs 12 may have a slight taper and a press fit in the apertures 13, if desired, but they are securely held against displacement from, and movement relative to, the spring leaf on which they are mounted by the adjacent leaf of the spring.

The bearing elements 11 are preferably formed of a metal composition which has a large lubricant absorbing capacity and their pores are filled with oil prior to assembling of the bearing elements in the spring. A suitable porous bearing composition may be produced by mixing together with 10 parts of powdered copper, by weight, and substantially 88.5 parts of sponge iron, which is a finely comminuted amorphous iron powder having particles that are highly porous or sponge-like, as the name indicates. To this mixture is added substantially 1.5 parts of graphite. A small amount of lubricant either liquid, such as petroleum oil, or solid such as stearic acid, is then incorporated in the mixture of powdered metals to aid in the subsequent coining operation.

Figure 3:
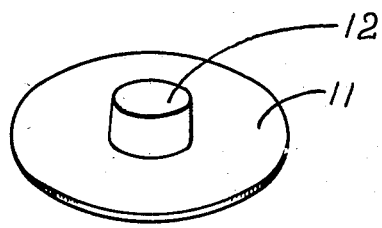
Fig. 3 is a perspective view of my improved porous, lubricant retaining spring leaf separating device.

Bearing elements of the shape shown in Fig. 3 are then formed by compressing the above mixture between suitable dies under a pressure of from 25,000 to 50,000 pounds per square inch. The compressed articles are then sintered at a temperature of substantially 2100° F. in a non-oxidizing or reducing atmosphere and they are either quenched in oil before cooling, or immersed in oil after they have been cooled to room temperature. The porous structure of the bearing elements permits a substantial quantity of oil to be absorbed.

The oil permeates through the body of the bearing element to the surface thereof on which one of the leaves of the spring slides. In this manner, the contacting surfaces of the bearing elements and spring leaves are continuously lubricated and the creation of squeaks and other obnoxious noises is avoided.

Porous bearing metal compositions of the above character are sufficiently flexible to conform to the curvatures of the opposed surfaces of adjacent spring leaves and they are adapted to bear the entire pressure exerted by one leaf upon another. The bearing elements engage only limited areas of the spring leaves and they hold the entire lengths of the opposed surfaces of adjacent leaves, including the extremities thereof in spaced relation. In this way the extremities of each leaf are prevented from digging into the surfaces of the adjacent leaf. This feature of the invention eliminates the costly operations heretofore required in trimming the corners and removing the burs from the extremities of the leaves of springs of this type.

Various other porous metal compositions, such as porous bronze, may be used in place of the sponge iron composition set forth. Suitable porous bronze bearing elements may be formed by compressing a mixture containing substantially 85 parts of powdered copper, 13 parts of powdered tin, about 2 parts of graphite, by weight, and a small amount of stearic acid. After the mixture is compressed into a desired shape, it is heated to a temperature of 1500° F. in a reducing or non-oxidizing atmosphere and immersed in oil or other suitable lubricant.

Although but one specific embodiment of this invention has herein been shown and described, it will be understood that various changes in the size, shape and arrangement of parts may be made without departing from the spirit of our invention and it is not our intention to limit its scope other than by the terms of the appended claims.

What we claim is:

1. A spring including a plurality of superimposed leaves, and an anti-friction spacing element between an adjacent pair of said leaves fixed against movement relative to one of said pair of leaves and comprising a porous bearing metal having a substantial lubricant content.

2. A spring including a plurality of superimposed leaves, a bearing element spacing a pair of adjacent leaves and fixed against movement relative to one of said leaves and comprising a porous metal composition having sufficient flexibility to conform to the contour of the adjacent surface of the other leaf and having a substantial absorbed lubricant content.

3. A spring including a plurality of superimposed leaves having apertures in their end portions, combined spacing and bearing elements between the end portions of adjacent leaves, each having an integral lug anchored in an aperture of one of said leaves and comprising a porous metal structure having a substantial absorbed lubricant content.

4. A spring including a pair of superimposed leaves, separators including porous anti-friction bearing metal having a substantial absorbed lubricant content between opposed surfaces of said leaves holding substantially the entire lengths of said opposed surfaces from contacting with each other, and means on said separators for holding the latter against movement relative to one of said leaves.

5. A spring including a plurality of superimposed leaves having apertures in the end portions thereof, combined bearing and spacing elements comprising porous metal discs having a large absorbed lubricant content between opposed faces of adjacent pairs of said leaves and each having an integral central lug seated in one of said apertures for holding said bearing elements against movement relative to one leaf of each adjacent pair of leaves, and means for clamping said leaves together.

6. A spring lubricating device comprising a plate adapted to fit between and conform to the surfaces of adjacent spring leaves, and means adapted to prevent the displacement of said device, said plate being composed of an initially lubricant saturated porous metal comprising sintered copper and tin powders.

7. A spring lubricating device comprising a flat plate adapted to fit between and conform to the surfaces of adjacent spring leaves, and means adapted to prevent the displacement of said device, said plate being composed of an initially lubricant saturated porous metal comprising sintered sponge iron and copper powders.

8. A spring leaf spacing and lubricating member comprising an initially lubricant impregnated porous metal plate provided with means for positioning the plate relative to the spring leaves.

9. A spring lubricating device comprising a flat plate adapted to fit between adjacent spring leaves, said plate being composed of initially lubricant saturated porous metal, and means adapted to secure said plate to one of said spring leaves and to supply lubricant to said plate.

WILLIAM G. CALKINS.
CLARK A. TEA.